United States Patent [19]

Hunke et al.

[11] 4,192,635
[45] Mar. 11, 1980

[54] APPARATUS FOR COOLING AND GRANULATING THERMOPLASTIC STRANDS

[75] Inventors: Friedrich Hunke, Grossostheim-Ringheim; Heinz Philipp, Aschaffenburg, both of Fed. Rep. of Germany

[73] Assignee: Automatik Apparate-Maschinenbau H. Hench GmbH, Grossostheim, Fed. Rep. of Germany

[21] Appl. No.: 858,387

[22] Filed: Dec. 7, 1977

[30] Foreign Application Priority Data

Dec. 9, 1976 [DE] Fed. Rep. of Germany ....... 2655840

[51] Int. Cl.² .............................................. B29C 25/00
[52] U.S. Cl. ...................................... 425/71; 425/308;
425/377; 425/382.2; 425/404; 425/464
[58] Field of Search .......... 83/401; 264/178 R, 178 F,
264/143, 148; 425/377, 404, 445, 68, 67, 70, 71,
308, 315, 382 R, 382.2, 463, 464, DIG. 230, 378
S, 379 S, 317, 294

[56] References Cited

U.S. PATENT DOCUMENTS 3,890,074  6/1975  Fritsch .............................. 425/377 X
4,025,252  5/1977  Hunke ................................ 425/67

Primary Examiner—Mark Rosenbaum
Attorney, Agent, or Firm—Wolfgang G. Fasse; Francis D. Gould

[57] ABSTRACT

The present apparatus cools and granulates thermoplastic strands. For this purpose two cooling chutes are arranged in mirror symmetric, back to back fashion between the strand ejecting nozzles and the input gap between two feeding rollers which supply the strands to a cutting roller. The upper ends of the chutes receive the strands from two sets of nozzles such as extruder nozzles. The nozzles in one set are arranged in a row staggered relative to the nozzles in the other set so that the strands emerging from one set of nozzles fit into the spaces between the strands emerging from the other set of nozzles when the strands enter into the cutter.

7 Claims, 3 Drawing Figures

APPARATUS FOR COOLING AND GRANULATING THERMOPLASTIC STRANDS

BACKGROUND OF THE INVENTION

The present invention relates to an apparatus for cooling an granulating thermoplastic strands. Conventionally, these granulating machines are equipped with a run-off or discharge chute arranged between the nozzles and the granulating cutting roller. The upper end of the discharge chute is provided with cooling water supply means so that the strands emerging from the nozzles in a molten condition are immediately cooled and sticking is prevented. The lower end of the chute leads the strands into the gap between two feed advance rollers which in turn supply the strands into the cutting roller proper.

Our U.S. Pat. No. 4,025,252, issued May 24, 1977 discloses a prior art granulating apparatus of the just described type. The chute in our prior granulating apparatus projects out of the plane defined by the exit openings of the nozzles and the inlet gap of the feed advance rollers in order to subject the strands to a beneficial tensioning as they travel from the nozzles over the chute to the transport rollers. The prior patent also discloses a twin embodiment in which two chutes and two sets of feed advance rollers as well as two cutting rollers are combined in a twin type arrangement. Our prior art apparatus works very efficiently. However, it has been found, that the efficiency can further be increased by more fully utilizing the cutting capacity of the cutting roller.

OBJECTS OF THE INVENTION

In view of the above, it is the aim of the invention to achieve the following objects, singly or in combination:

to increase the throughput of strands through an apparatus of the type described above, more specifically, to take advantage of the cutting capacity of the cutting rollers to the fullest possible extent;

to supply a single cutting roller with the strands from at least two chutes; and to assure a continued cooling of the chute or chutes even if the cooling water supply should be temporarily interrupted.

SUMMARY OF THE INVENTION

According to the invention there is provided an apparatus for cooling and granulating thermoplastic strands which is characterized in that two discharge chutes are arranged substantially in a mirror symmetrical fashion and back to back so that their lower ends lead into the feed-in gap between two feed advance rollers downstream of which, as viewed in the feed advance direction of the strands, there is arranged a cutting roller. The upper ends of the chutes receive the strands from two rows of strand ejecting nozzles arranged alongside each other with the nozzle openings in one row staggered relative to the nozzle openings in the other row so that the cooled strands in one group of strands are also staggered relative to the strands in the other group of strands, whereby the strands of one group fit into the spaces of the other group and vice-versa as the strands pass into the gap between the feed advance rollers.

According to the invention two effects are combined in a suitable manner. On the one hand, the advantageous effect of the projecting discharge chute is utilized to assure a positive guiding of the strands sliding down in the chute. On the other hand, it is possible to combine the strands advancing in two columns, into a single column due to the mirror symmetrical arrangement of two discharge chutes, the ends of which lead into the gap between the feed advance rollers since the strands on one chute are staggered relative to the strands on the other chute so that the strands fit into the gap of the respective other row of strands. Bringing the strands into a meshing relationship, so to speak, below the lower end of the chute is possible according to the invention because at this point the strands have been sufficiently cooled so that they will not stick to each other even if they should touch each other. In this manner the invention achieves the advantage that the strands can be guided relatively close to each other along each discharge chute to the good guiding characteristics of the chutes and to then substantially reduce the spacing betweent adjacent strands still further by merging the two columns of strands into one column, thereby reducing the spacing to at least one half the previous spacing, whereby it may even be possible to feed these strands into the gap between the feed advance rollers, in contact with each other due to the fact that the strands at this point have been sufficiently cooled. In this manner the invention makes a maximum use of the cutting capacity of the cutting roller which is capable of cutting the strands coming from two chutes without causing any clogging. This type of strand guiding achieved according to the invention has the additional advantage that the strands support each other and thus guide each other in the area of the feed advance rollers and in the area of the cutting roller.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
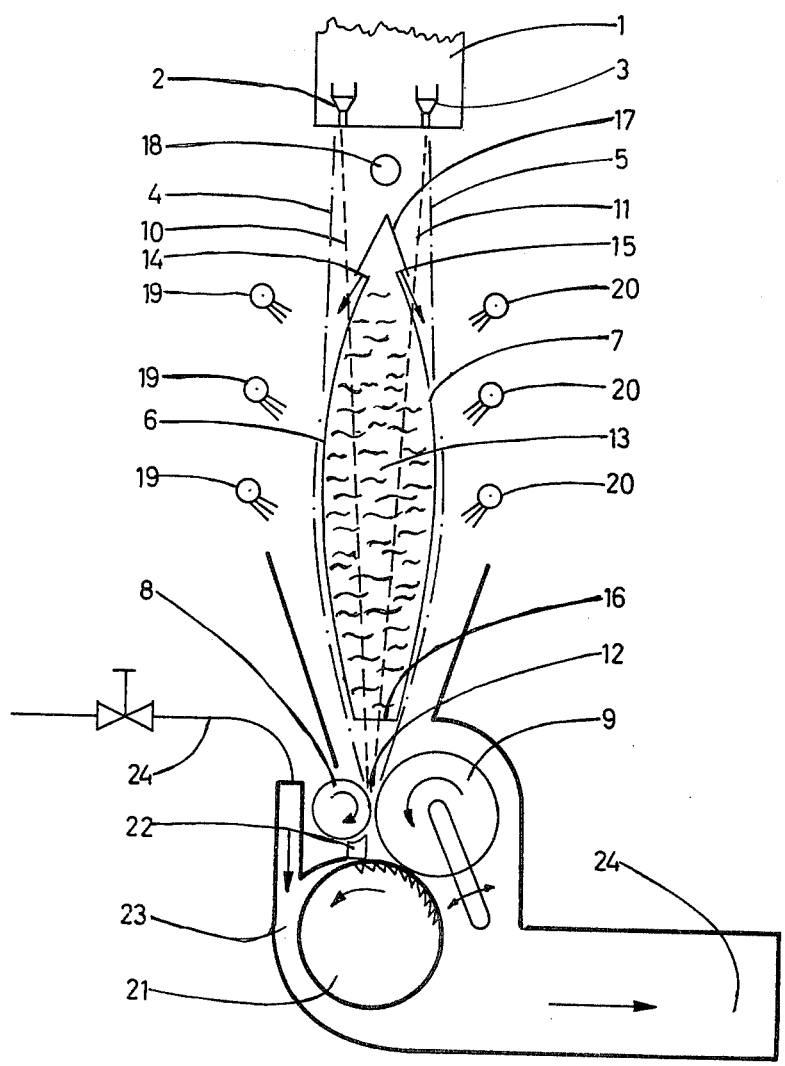
FIG. 1 is a schematic illustration of a side view of an apparatus according to the invention.
Figure 2:
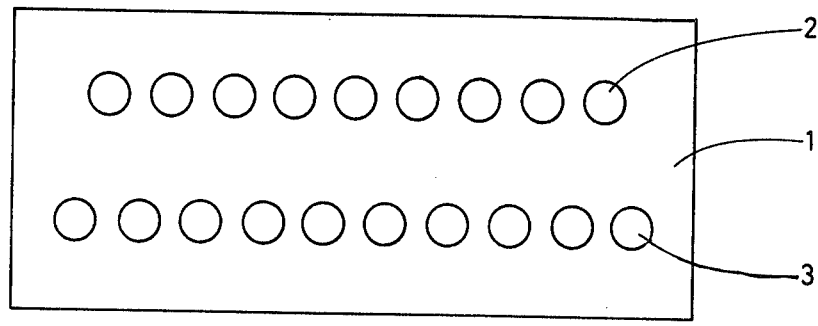
FIG. 2 is a view against the downwardly facing surface of the spinneret illustrating the two rows of spinning nozzles staggered relative to each other.

FIG. 1 illustrates a side view of the present apparatus comprising a spinneret 1 having two parallel rows 2 and 3 of nozzles as best seen in FIG. 2. The thermoplastic strands emerge from these nozzles 2 and 3 in a molten, liquid state. The thermoplastic melt is supplied to the spinneret or nozzle block 1 by means of any conventional device such as an extruder or the like. These nozzles 2 and 3 form strands 4 and 5 of the molten thermoplastic material. The strands 4, 5 are shown by dash-dotted lines. Due to gravity the strands 4 and 5 are guided onto the discharge and cooling chutes 6 and 7, whereby the pull of the feed advance rollers 8 and 9 causes the strands to be properly guided along the working surfaces of the chutes 6 and 7 since these surfaces project outwardly beyond the respective plane 10, 11 defined by the in-feed gap 12 between the two feed advance rollers 8 and 9 at the lower end and the respective row 2, 3 of nozzles at the upper end.

Cooling water is supplied to the discharge nozzles 6 and 7 in two ways. On the one hand, according to the invention, the two chutes 6 and 7 confine a hollow space 13 which is connected to a cooling water supply line (not shown). At the upper end the hollow space or container 13 is provided with overflow edges 14 and 15. As soon as the cooling water has filled the container 13 the water will flow over the edges 14 and 15 and down again on the working surfaces of the chutes 6 and 7. In addition, cooling water may be supplied to the strands on the working surfaces of the chutes 6 and 7 by means of spray nozzles 19 and 20. Due to the continuous overflow as indicated by the arrows at the upper overflow edges 14 and 15 of the chutes 6 and 7 the strands 4, 5 are continuously wetted with the cooling water along their entire length. It has been found that in spite of the inward curve of the working surface of the chutes toward the lower end 16 of the container 13 formed by the chutes, the cooling water remains in contact with the working surface of the chutes 6 and 7 due to adhesion of the thin film or layer of the water flowing down the surfaces of the chutes. In this manner it is assured that the strands 4 and 5 are surrounded by cooling water along the entire travel path over the chutes 6 and 7.

Above the upper ends 14 and 15 of the chutes 6 and 7, there is arranged a roof-like cover 17 which prevents any extraneous matter from falling into the hollow space 13 between the chutes 6 and 7. This roof-like structure 17 also prevents the strands from entering into the space at the beginning of an extruding and granulating operation. The lower edges of the cover 17 reach sufficiently downward so that the cover 17 is cooled by the water flowing over the upper edges 14 and 15 of the chutes 6 and 7. Thus, strands contacting the outer surface of the cover 17 are prevented from sticking against the cover. Above the cover 17 there is arranged an elongated spray nozzle 18 which also provides cooling water for the cover 17. The nozzle 18 sprays downwardly along the cover 17. The arrangement is such, that the water flowing off the cover 17 is also guided into the respective chutes 6 and 7. If desired, and by adequately supplying water to the nozle 18, it is possible to use this nozzle 18 as the sole water supply for the operation of the apparatus.

As mentioned, further spray nozzles 19 and 20 are arranged laterally relative to the discharge chute 6 and 7, whereby cooling water may be sprayed from the sides against the chutes. It is also possible to use the spray nozzles 19 and 20 as the sole water supply, especially if the uppermost pair of the spray nozzles 19 and 20 is arranged high enough so that the spray may be directed onto the upper ends 14 and 15 of the chutes 6 and 7, thereby supplying the entire length of the chutes with cooling water. For practical reasons it may be advantageous however, to use all three types of water supply, namely, the nozzles 19 and 20 as well as the nozzle 18 and the overflow water in the space 13.

The above mentioned feed advance or pull-in rollers 8 and 9 are arranged below the discharge chutes 6 and 7. For pulling the strands 4 and 5 downwardly through the gap 12 and thus toward the cutting roller 21 which ccooperates with a counter-cutting edge 22 for granulating the strands 4 and 5. The granulated material enters into the channel 23 between the cutting roller 21 and the housing wall. Cooling water is supplied to the channel 23 through a conduit 24 which makes sure that the granulated material will not clog the channel 23, The water transports the granulated material to the output end 24 of the apparatus.

FIG. 2 illustrates in a schematic manner the downwardly facing surface of the spinneret or nozzle block 1 showing the two rows of nozzles 2 and 3 which are staggered to each other. The spacing between adjacent nozzles is such that the strands supplied by the nozzles 2 to the chute 6 and the strands supplied by the nozzles 3 to the chute 7 are sufficiently spaced from each other when they contact the respective chute where the strands are immediately enveloped with the cooling water. The spacing is sufficient to avoid any sticking of the strands to each other because at the point where they first contact the respective chute, the strands still have a substantial thickness. The spacing between the strands is maintained as the strands are sliding down the chutes, whereby the latter make sure, due to their projecting beyond the above mentioned connecting lines or planes 10, 11, that the strands 4 and 5 are prevented from wriggling laterally, whereby any danger of contact between adjacent strands is avoided. When the strands reach the lower end 16 of the chutes 6 and 7 they are sufficiently cooled so that now there is no further danger of sticking even if the strands should contact each other.

Figure 3:
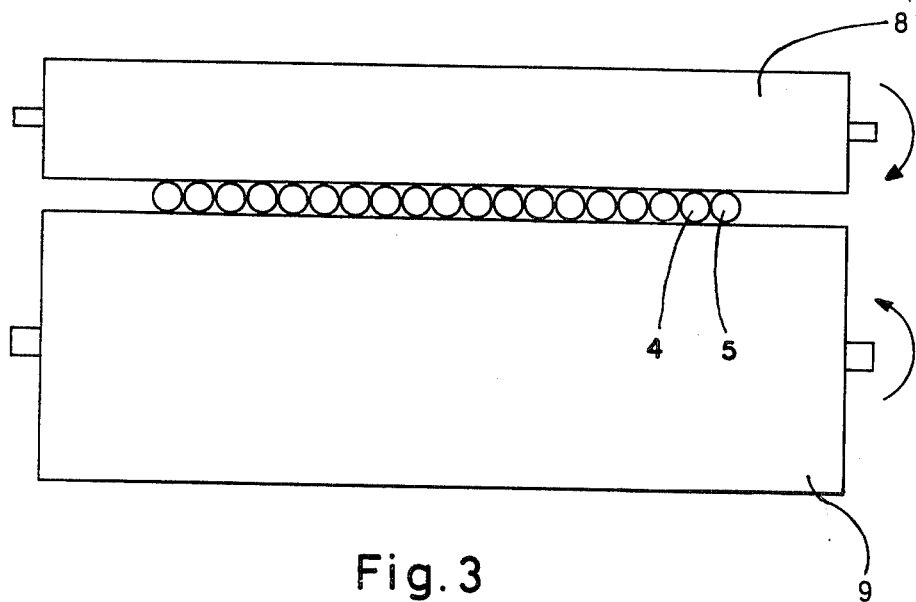
FIG. 3 shows the guiding of the strands through the gap between the feed advance rollers.

Thus, according to the invention these strands are now supplied to the gap 12 between the feed rollers 8 and 9 below the lower end 16 of the chutes in an intermeshing manner where the strands may even contact each other since the strands of one column are guided into the spaces between the strands of the other column as illustrated in FIG. 3. FIG. 3 shows the feed rollers 8 and 9 and the strands 4 and 5 passing through the gap 12 between these rollers. Thus, the cutting roller 21 arranged downstream of the feed rollers 8 and 9 receives the strands 4 and 5 as the latter contacts each other. This feature of the invention has the advantage that the entire length of the cutting roller 21 is fully utilized for the granulating of the strands.

If it should be deemed desired, to provide more space between adjacent nozzles 2 and 3, in the spinneret 1 so as to provide a larger spacing between the strands 4 and 5 as they emerge from the nozzles 2 and 3 the latter may be arranged in a zigzag pattern without changing the staggered relationship between the nozzles of one group and the nozzles of the other group. Thus, it is possible to provide any desired spacing for the strands as they emerge from the nozzles. With regard to the above described cooling by continuously replenishing the water in the space 13, the advantage is achieved that the chutes 6 and 7 are also cooled internally so to speak so that even if the pressure in the cooling water supply line should be interrupted and hence, an overflow should not take place over the upper ends of the chutes 6 and 7, the water in the space 13 will still make sure that the cooling of the chutes is continued at least for a certain length of time so that any strands which should be continued to be supplied even after the interruption of the cooling water supply, will not start immediately to stick to the chutes 6 and 7.

Further, as mentioned, the internal cooling and water supply from the space 13 may be combined with the spray nozzles 18, 19, and 20 in any desired fashion.

The above mentioned roof type cover 17 above the entrance end of the chutes 6 and 7 has the advantage that the strands are automatically guided on the chutes and cannot enter into the space 13 at the beginning of the operation. Further, the cover 17 in combination with the elongated nozzle 18 has the advantage that the spray water from the nozzle 18 is properly guided onto the chutes. The nozzle 18 assures a proper cooling of the cover 17 which in addition is exposed to a cooling action by the wafter flowing over the upper edges 14 and 15, thus especially at the beginning of an operation any sticking of the strands is avoided. This may be accomplished even where the elongated spray nozzle 18 is the only water supply. However, for purposes of redundancy, the several types of water supply may be used in combination as described. Although the invention has been described with reference to specific example embodiments, it will be appreciated, that it is intended, to cover all modifications and equivalents within the scope of the appended claims.

What is claimed is:

1. An apparatus for cooling and granulating thermoplastic strands, comprising spinneret means including two rows of nozzles (2, 3) arranged so that the nozzles in one row are staggered relative to the nozzles in the other row, one single pair of transport rollers (8, 9) arranged below said nozzle means, cooling chute means (6, 7) operatively arranged between said nozzles and said single pair of transport rollers, a single set of chutting means (21) arranged below said transport roller means which form an inlet for said single set of cutting means, cooling liquid supply means arranged for supplying cooling liquid to said cooling chute means (6, 7) substantially at the upper end thereof, said cooling chute means comprising two chutes arranged back to back in mirror symmetrical relationship relative to each other, each chute having a curved guide surface that projects toward the respective strands beyond a plane defined by the respective row of nozzles and said transport roller means whereby the strands from said two rows of nozzles are cooled separately, and wherein both guide surfaces have an inward curve portion converging inwardly toward said inlet of the single set of cutting means to such an extent that the cooling liquid remains substantially in contact with the guide surface of the respective chute, whereby the strands are surrounded by cooling liquid along the entire travel path on the chutes, said staggering of said nozzles causing the strands from one row of nozzles to fit into the spaces between the strands from the other row of nozzles and vice versa as the strands are fed to the cutting means, whereby said staggering of said nozzles in combination with said converging of said guide surfaces permits the feeding of a single set of strands from said two rows of nozzles into said single set of cutting means.

2. The apparatus of claim 1, wherein said cooling chute means define a container for cooling liquid, said container having overflow means substantially at its upper end, whereby cooling liquid is supplied to both chutes.

3. The apparatus of claim 1, wherein said cooling liquid supply means comprise cooling liquid spraying means arranged laterally adjacent to each of said two chutes.

4. The apparatus of claim 1, further comprising strand guide means arranged above the upper end of said two chutes and below said two rows of nozzles.

5. The apparatus of claim 4, further comprising elongated cooling liquid spraying means arranged above said strand guide means and below said two rows of nozzles.

6. The apparatus of claim 4, wherein said strand guide means have the shape of a gabled roof each side of which guides its respective row of strands onto the corresponding chute.

7. The apparatus of claim 1, further comprising funnel means into which said converging guide surfaces of said cooling chute means extend whereby cooling liquid flowing off said chute means is supplied simultaneously with the strands to the cutting means.

* * * * *

UNITED STATES PATENT AND TRADEMARK OFFICE
CERTIFICATE OF CORRECTION

PATENT NO. : 4,192,635

DATED : March 11, 1980

INVENTOR(S) : Friedrich Hunke et al.

It is certified that error appears in the above—identified patent and that said Letters Patent is hereby corrected as shown below:

Column 5, line 22, "chut-" should read --- cut- ---.

Signed and Sealed this

Sixteenth Day of December 1980

[SEAL]

Attest:

SIDNEY A. DIAMOND

Attesting Officer

Commissioner of Patents and Trademarks